United States Patent [19]

Koma

[11] Patent Number: 5,666,179
[45] Date of Patent: Sep. 9, 1997

[54] LIQUID CRYSTAL DISPLAY DEVICE HAVING OPENING FORMED IN ELECTRODE

[75] Inventor: Norio Koma, Gifu, Japan

[73] Assignee: Sanyo Electric Co., Ltd., Osaka, Japan

[21] Appl. No.: 712,287

[22] Filed: Sep. 12, 1996

Related U.S. Application Data

[63] Continuation of Ser. No. 226,706, Apr. 12, 1994, abandoned.

[30] Foreign Application Priority Data

Apr. 12, 1993 [JP] Japan ................... 5-084696

[51] Int. Cl.⁶ .................... G02F 1/1337; G02F 1/1343
[52] U.S. Cl. .............................. 349/143; 349/130
[58] Field of Search ................ 359/87, 75; 349/142, 349/139, 143, 130

[56] References Cited

U.S. PATENT DOCUMENTS

| | | | |
|---|---|---|---|
| 5,084,778 | 1/1992 | DeJule et al. | 359/87 |
| 5,136,407 | 8/1992 | Clerc | 359/87 |
| 5,229,873 | 7/1993 | Hirose et al. | 359/87 |
| 5,309,264 | 5/1994 | Lien et al. | 359/87 |

OTHER PUBLICATIONS

Yamamoto, Tsuyoshi, et al., "Full–Cone Wide–Viewing–Angle Multicolor CSH–LCD", SID 91 Digest, pp. 762–765.

*Primary Examiner*—Anita Pellman Gross
*Assistant Examiner*—Toan Ton
*Attorney, Agent, or Firm*—Loeb & Loeb LLP

[57] ABSTRACT

A liquid crystal display device having openings formed in electrodes using an ECB mode to provide an improved image display quality. There is provided a liquid crystal layer having a liquid crystal director vertically aligned between a plurality of pixel electrodes and an opposed electrode. An opening without any electrode therein is formed at a predetermined position of the opposed electrodes corresponding to the respective pixel electrode. As a result, the oriented direction of the liquid crystal director in each pixel is stably determined, enabling reduction of the dispersion of the orientation of the liquid crystal direction for each pixel and to widen the viewing angle.

12 Claims, 10 Drawing Sheets

LIQUID CRYSTAL DISPLAY DEVICE HAVING OPENING FORMED IN ELECTRODE

This is a continuation of application Ser. No. 08/226,706, filed Apr. 12, 1994, now abandoned.

BACKGROUND OF THE INVENTION

1. Field of the Invention

The present invention relates to a liquid crystal display device having an opening formed in an electrode, and more particularly to a liquid crystal display device which is capable of making display with an widened viewing angle in a making vertically aligned ECB (Electrically Controlled Birefringence) mode.

2. Description of a Related Art

A conventional liquid crystal display device will be described with reference to the accompanying drawings. The TN (Twisted Nematic) mode has been widely used in general as a liquid crystal display device. This TN-type liquid crystal display device has alignment layers, with mutually different orientations, provided at each of opposed surfaces of a pair of substrates holding a liquid crystal layer therebetween. The direction of the liquid crystal director remains in a twisted state between both substrates when no voltage is applied to the liquid crystal cell.

In the manufacturing process of the TN-type liquid crystal display device, a processing step has been required for rubbing the surface of the alignment layer in the predetermined direction with a silk cloth or the like, for aligning the liquid crystal director at the surface of the alignment layer composed of macromolecular film such as polyimide to orient the liquid crystal director (this processing step is referred to as a rubbing process).

However, since static electricity is generated during the rubbing process, the charges must be removed by post-processing to prevent undesirable effects, necessarily increasing the number of processing steps.

Further, in the TN-type liquid crystal display device, the viewing angle characteristics vary depending on the viewing direction. In some cases, a problem arises, the so-called image reversal problem, in which the displayed image looks inverted, so that the desired viewing angle characteristics are not maintained for all the viewing directions. This is due to the limitation inherent in TN mode that the desired viewing angle characteristics are related to the rubbing direction.

On the other hand, there is also known a liquid crystal display device called ECB in which the liquid crystal director on the surface of the alignment layer is oriented in the vertical direction with respect to the surface.

Figure 1:
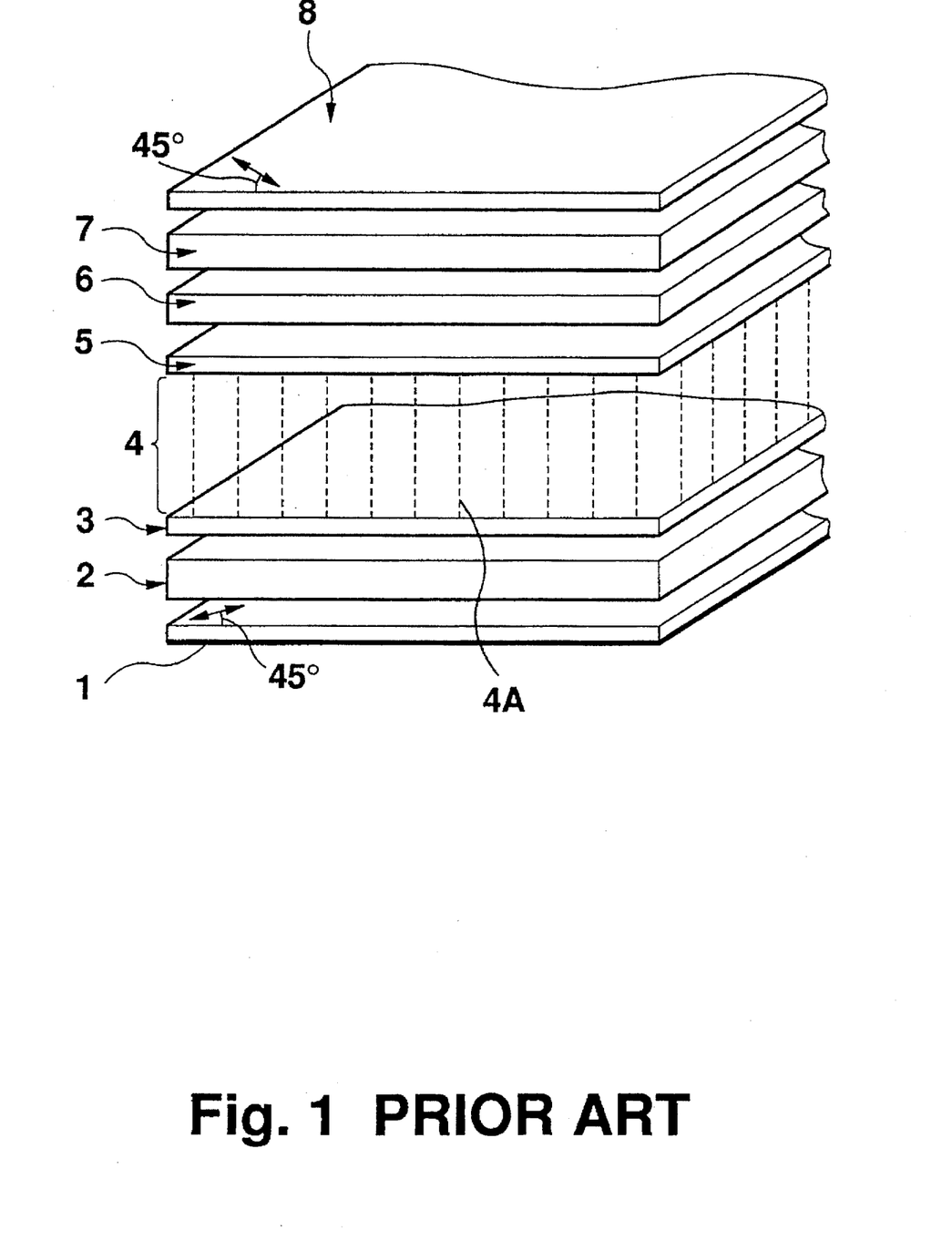
FIG. 1 shows a composition of a conventional liquid crystal display device.

FIG. 1 shows a composition of a conventional liquid crystal display device using a vertical alignment layer. This device comprises: a TFT (Thin Film Transistor) substrate 2; a first vertical alignment layer 3; a liquid crystal layer 4; a second vertical alignment layer 5; an opposed electrode 6; and a second polarizing plate 8 all provided on a first polarizing plate 1. An opposed substrate 7 is provided between the opposed electrode 6 and the second polarizing plate 8. In this device, since the liquid crystal molecules at the surface of the alignment layer are oriented in a vertically aligned state due to the excluded volume effect, the liquid crystal director are accordingly oriented in a vertically aligned state, so that no rubbing process is required at this time. The polarizing axes of the first polarizing plate 1 and the second polarizing plate 8 mutually form an angle of 90 degrees (this state will be referred to as crossnicole hereafter).

In operation, light incident on the first polarizing plate 1 side then becomes linearly polarized light, and passes through the TFT substrate 2 and enters the liquid crystal layer 4.

When no voltage is applied between a pixel electrode (not shown) provided on the TFT substrate 2 and the opposed electrode 6, the liquid crystal molecules 4A of the liquid crystal layer 4 are arranged in the vertical direction, and the light having passed through the liquid crystal layer 4 remains linearly polarized light which is totally removed by the second polarizing plate 8. As a result, the incident light through the first polarizing plate 1 side does not pass therethrough.

Meanwhile, when a voltage is applied between the pixal electrode and the opposed electrode provided on the TFT substrate 2 (not shown) and the opposed electrode 6. Since the liquid crystal molecules 4A bend in accordance with the electric field, the light passing through the liquid crystal layer 4 exhibits birefringence along the liquid crystal molecular axis. So the light out of the liquid crystal layer 4 becomes elliptically polarized light, and is not removed by the second polarizing plate 8 and passes through the second polarizing plate 8.

However, according to such a conventional liquid crystal display device having the aforementioned electrode arrangement, problems arise as described below.

Figure 2:
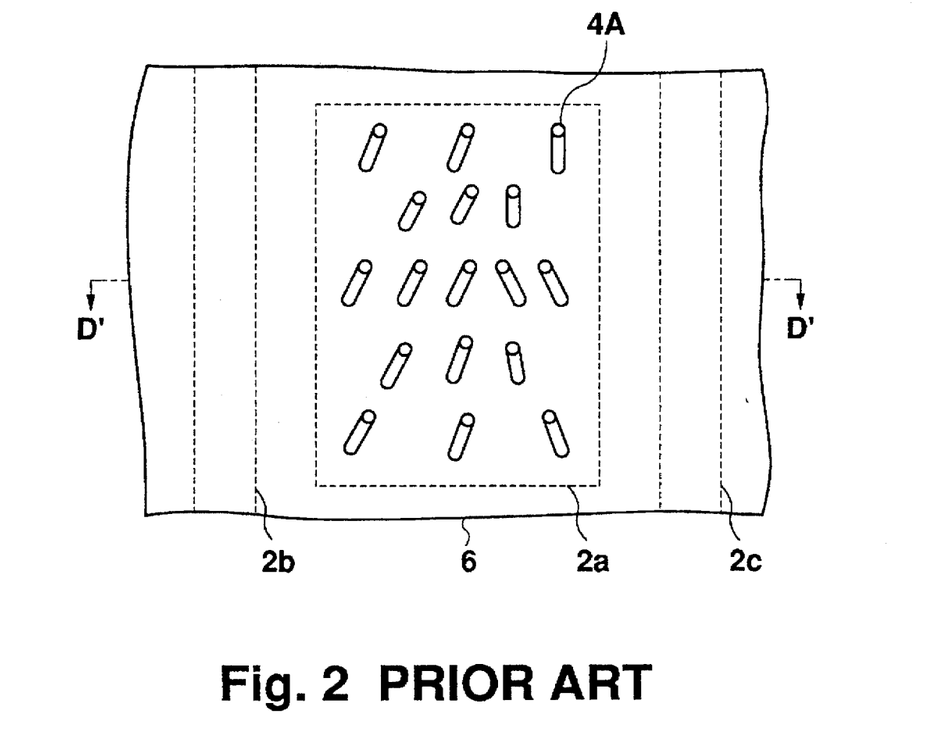
FIG. 2 is a plan view showing an arrangement of electrodes of a conventional liquid crystal display device.
Figure 3:
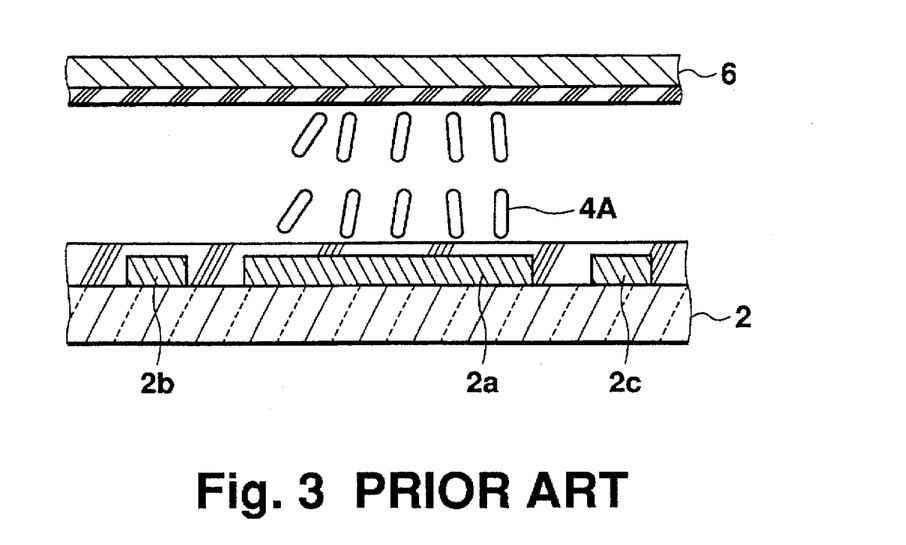
FIG. 3 is a schematic cross-sectional view along line D'—D' in FIG. 2.
Figure 4:
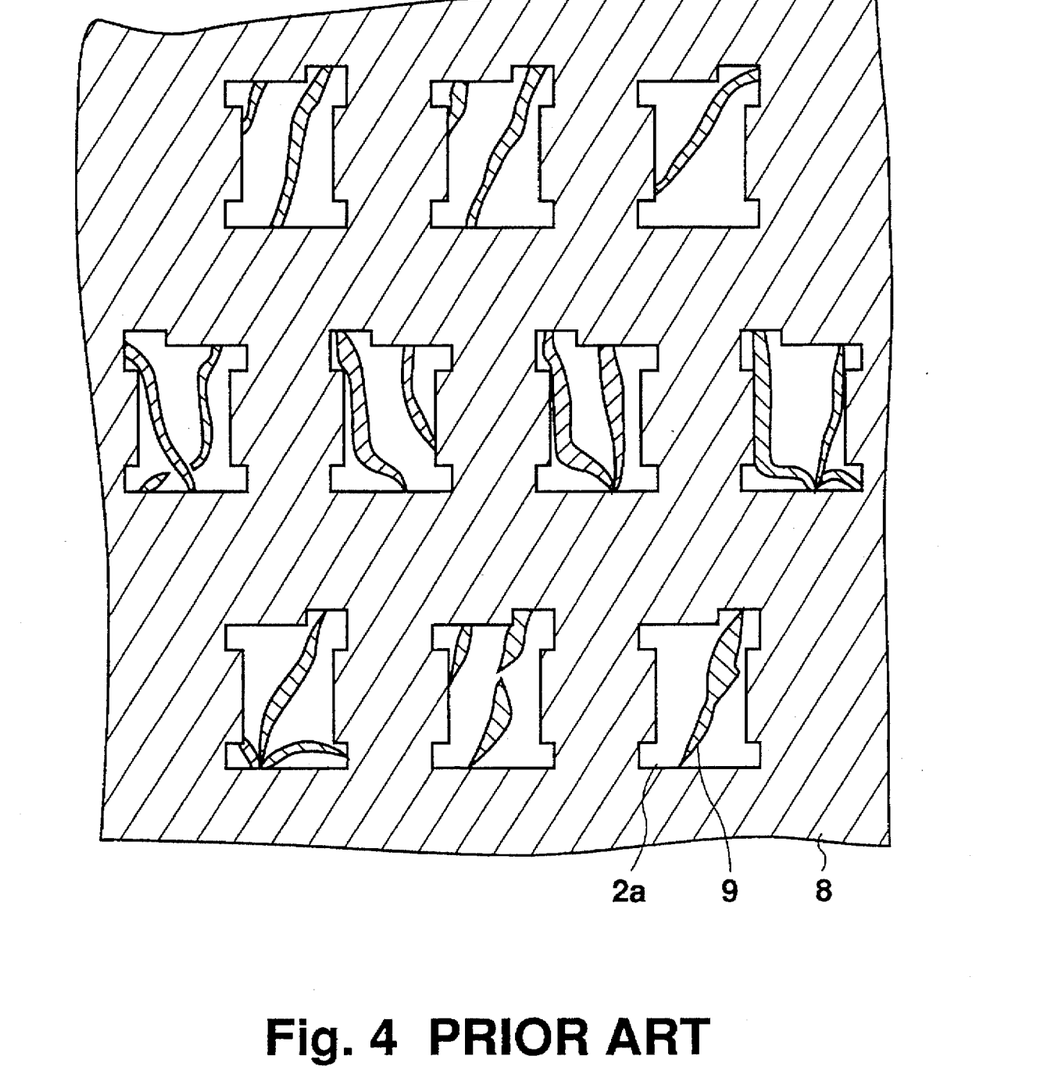
FIG. 4 is an explanatory view for the problems arising in the conventional liquid crystal display device.

FIG. 2 is a plan view showing a driving state of the conventional liquid crystal display device, while FIG. 3 is a cross-sectional view along line D'—D' in FIG. 2. FIG. 4 is a drawing for describing the problems in the conventional liquid crystal display device, which is seen from the display screen when voltage is applied to the pixel electrode to pass the light.

In the driving state of the liquid crystal display device, there is a potential difference between the pixel electrode 2a and the opposed electrode 6, and an electric field arises between the opposed electrode 6, pixel electrode 2a and the gate bus lines 2b and 2c, respectively. The liquid crystal molecules 4A in the liquid crystal layer 4 located between the opposed electrode 6 and the pixel electrode 2a become bent in accordance with the strength of the electric field as shown in FIG. 2.

Accordingly, as shown in FIG. 4, the light illuminated from the back surface of the device passes through in the region of the pixel electrode 2a. At the other regions, meanwhile, a light-shielding film is formed to improve the contrast (this region will be referred to as a light-shielding region 8 hereafter), where no light can pass through.

In this case, for example, the liquid crystal director is not identical even in the region of one pixel electrode 2a where the light passes therethrough, so that a disclination line indicating the border of the difference of the liquid crystal director appears on each pixel. At this region, the transmittance is lower in comparison with other regions.

It is impossible to align the liquid crystal director uniformly when the liquid crystal is sealed between the vertical alignment layers, resulting in a nonuniform state. As a result, the liquid crystal director of each pixel at the initial conditions would be dispersed.

Therefore, even if a voltage of the same conditions is applied to each pixel, the disclination lines 9 will not arise at the same portion for each pixel but nonuniformly as shown in FIG. 4.

Since the portions where the disclination lines 9 appear are varied for each pixel, mottles appear on the displayed screen, for example white spots on a displayed black screen, due to the fact that the visible portions of the disclination lines 9 are not identical for each pixel.

SUMMARY OF THE INVENTION

It is therefore an object of this invention to provide a liquid crystal display device capable of improving the viewing angle characteristics and displayed image quality without requiring a rubbing process.

Figure 5:
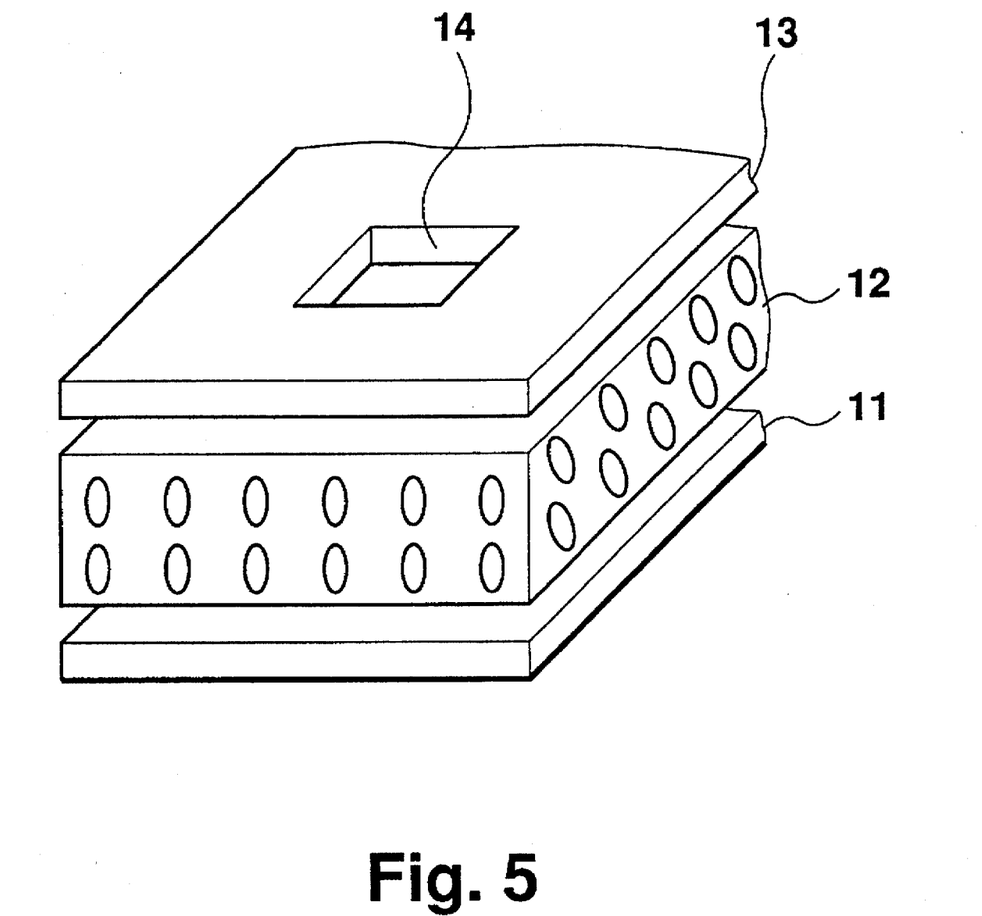
FIG. 5 shows a liquid crystal display device according to a first embodiment of the present invention.

In the present invention, a liquid crystal layer 12 having liquid crystal director aligned vertically between a plurality of pixel electrodes 11 and an opposed electrode 13, and an opening 14 not containing any electrode therein is formed in the opposed electrode 13. As a result, with this opening as a border, the oriented direction of the liquid crystal director can be controlled for each pixel.

According to an embodiment of the liquid crystal display device of this invention, for example as shown in FIG. 5, a liquid crystal layer 12 has a liquid crystal director vertically aligned between a plurality of pixel electrodes 11 and the opposed electrode 13, and an opening 14 is formed in the opposed electrode 13.

Accordingly, no electrode is present in the region of the opening 14. The electric field between the pixel electrode 11 and the opposed electrode 13 arising when a voltage is applied therebetween is quite weak at the region of the opening 14, so that the liquid crystal director in the liquid crystal layer 12 present in the opening 14 are scarcely affected by the electric field between the pixel electrode 11 and the opposed electrode 13. As a result, the liquid crystal director in this region keep the initial vertically aligned state and remain stably in the vertical alignment.

Since the liquid crystal director in the region of the opening 14 are stably aligned completely in the vertical direction, the orientation characteristics of the liquid crystal director at the peripheral region of the opening 14 also become stable due to the mutual effect with the liquid crystal director in the region of the opening 14. Namely, the orientation of the liquid crystal director of each pixel would have a certain regularity, for example an orientation toward the center of the pixel.

In consequence, if the opening 14 is formed at the same position for each pixel region, the liquid crystal director are oriented in the same direction for all the pixels at the time of display. Therefore, the liquid crystal director is not dispersed for each pixel, the disclination line indicating the orientation border of the liquid crystal director appears at almost at the same position for all the pixels. Thus, it becomes possible to prevent the mottles in the image.

In this manner, it is possible to provide a clear display image with improved viewing angle characteristics and fewer mottles without requiring any rubbing process, unlike the conventional liquid crystal display device.

The above and other objects, features and advantages of the present invention will become clear from the following description of a preferred embodiment thereof, taken in conjunction with the accompanying drawings.

DETAILED DESCRIPTION

A liquid crystal display device according to an embodiment of this invention will now be described with reference to FIGS. 6–13.

FIRST EMBODIMENT

Figure 6:
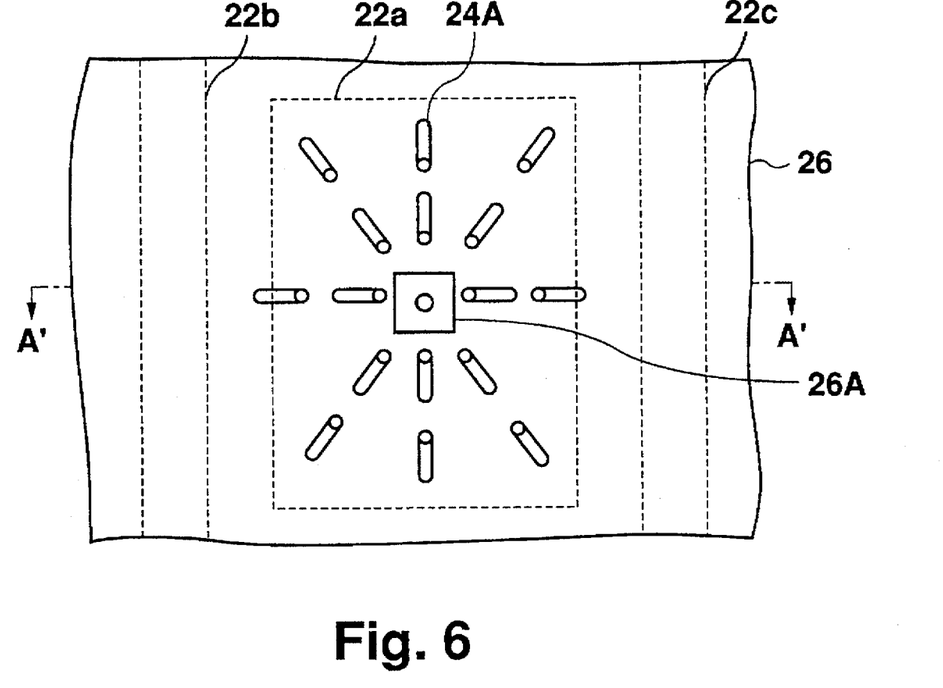
FIG. 6 is a plan view showing a composition of a liquid crystal display device according to the first embodiment of the present invention.

A liquid crystal display device according to a first embodiment of this invention will now be described. FIG. 6 is a plan view showing an arrangement of electrodes of the liquid crystal display device according to a first embodiment of the present invention, while FIG. 7 is a cross-sectional view along line A'—A' in FIG. 6.

Figure 7:
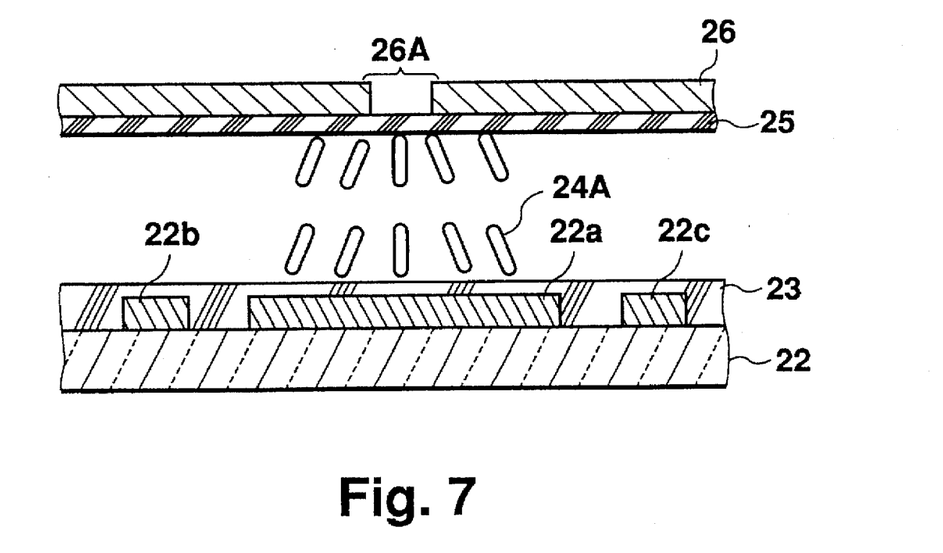
FIG. 7 is a schematic cross-sectional view along line A'—A' in FIG. 6.

The electrodes of the liquid crystal display device according to the first embodiment of this invention are arranged as shown in FIG. 7. A plurality of pixel electrodes 22a made of ITO (Indium Tin Oxide) film and having a dimension of 300 μm×200 μm are formed in a matrix, and gate bus lines 22b and 22c each with a width approximately 10 82 m are formed at both sides of the pixel electrodes 22a. A first vertical alignment layer 23 having liquid crystal director aligned vertically is formed on the pixel electrode 22a and the gate bus line 22b and 22c. On the other hand, on an opposed surface of the second substrate (not shown) but similar to the opposed substrate 7 shown in FIG. 1), there are provided an opposed electrode 26 made of ITO film and a second vertically aligned layer 25. The liquid crystal is sealed between the first vertically aligned layer 23 and the second vertically aligned layer 25 so as to form a liquid crystal layer with the liquid crystal molecules 24A being vertically oriented. The opposed electrode 26 is provided with an opening 26A formed in a square with 10 μm sides and located at approximately a central region of the pixel electrode 22a region.

One pixel electrode 22a, opposed electrode 26 and the liquid crystal layer being held between these two electrodes form a pixel, a minimum display unit.

A drain bus line (not shown) is formed to perpendicularly cross the gate bus lines 22b and 22c at the periphery of the pixel electrode 22a, and a TFT (not shown) for applying a driving voltage to each pixel electrode 22a is provided.

When the liquid crystal display device is started and a voltage is applied to the pixel electrode 22a, an electric field arises between the pixel electrode 22a and the opposed electrode 26 to band the liquid crystal molecules 24A of the liquid crystal layer present in the region of the pixel electrode 22a.

No electrode exists in the opening 26A, so that the electric field in this region is slight. As a result, the liquid crystal molecules 24A present in the region of the opening 26A are hardly subjected to the effect of the electric field. The liquid crystal molecules in this region therefore stably remain vertically aligned.

Due to the mutual effect of the liquid crystal molecules 24A in the region of the opening 26A, the orientation of the liquid crystal molecules 24A at the peripheral region of the opening 26A also becomes stable. Thus, the liquid crystal molecules 24A of each pixel become stably oriented toward the central portion of the pixel as shown in FIGS. 6 and 7, if the opening 26A is formed at the center of each pixel.

Figure 8:
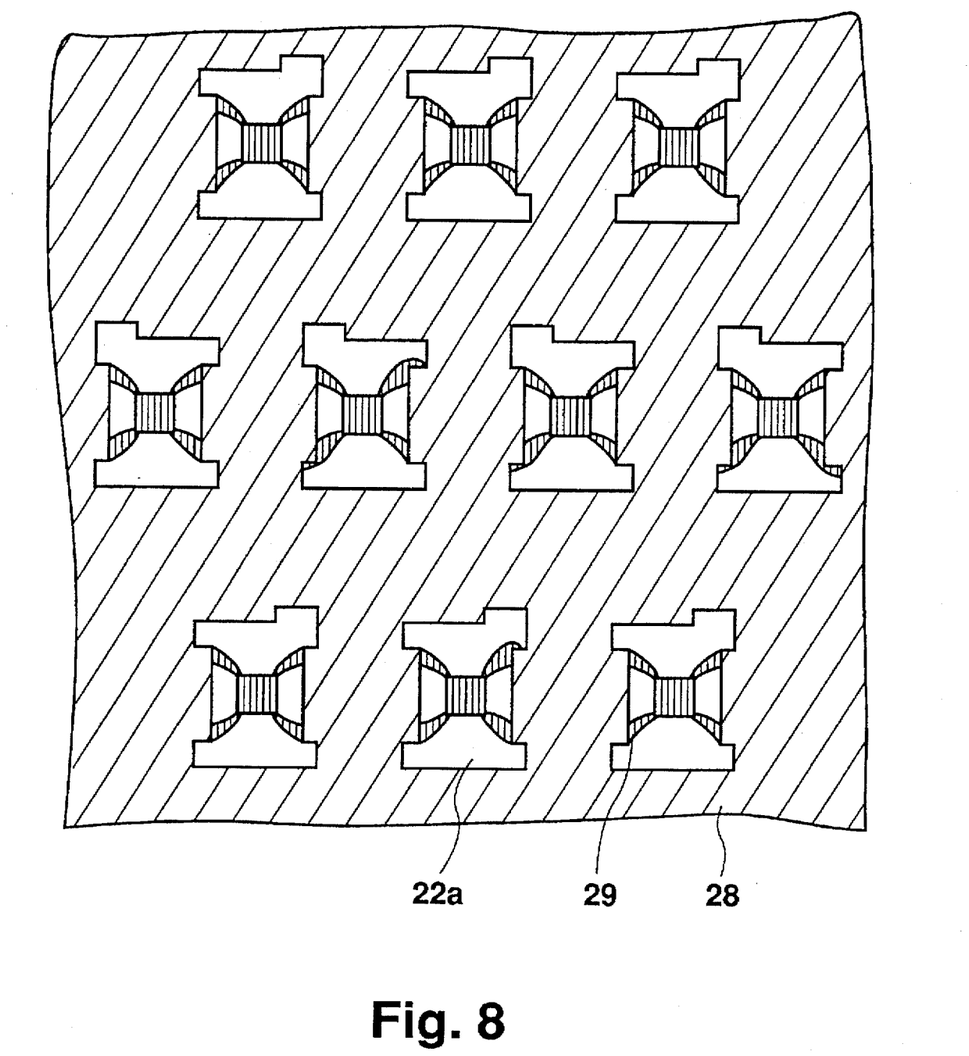
FIG. 8 is a plan view showing operations and effects of the liquid crystal display device according to the first embodiment of the present invention.

As shown in FIG. 8, if the opening 26A is formed at the same position of each pixel region, the liquid crystal molecules 24A will be oriented in the same manner for all the pixel. Therefore, the oriented direction of the liquid crystal molecules is not dispersed for each pixel, disclination lines indicating the border line of the different oriented directions of the liquid crystal molecules 24A appear uniformly for all the pixels. As a result, it is possible to prevent mottles from appearing in the image.

Thus, a clear display image with improved viewing angle characteristics and fewer mottles can be provided.

Figure 9:
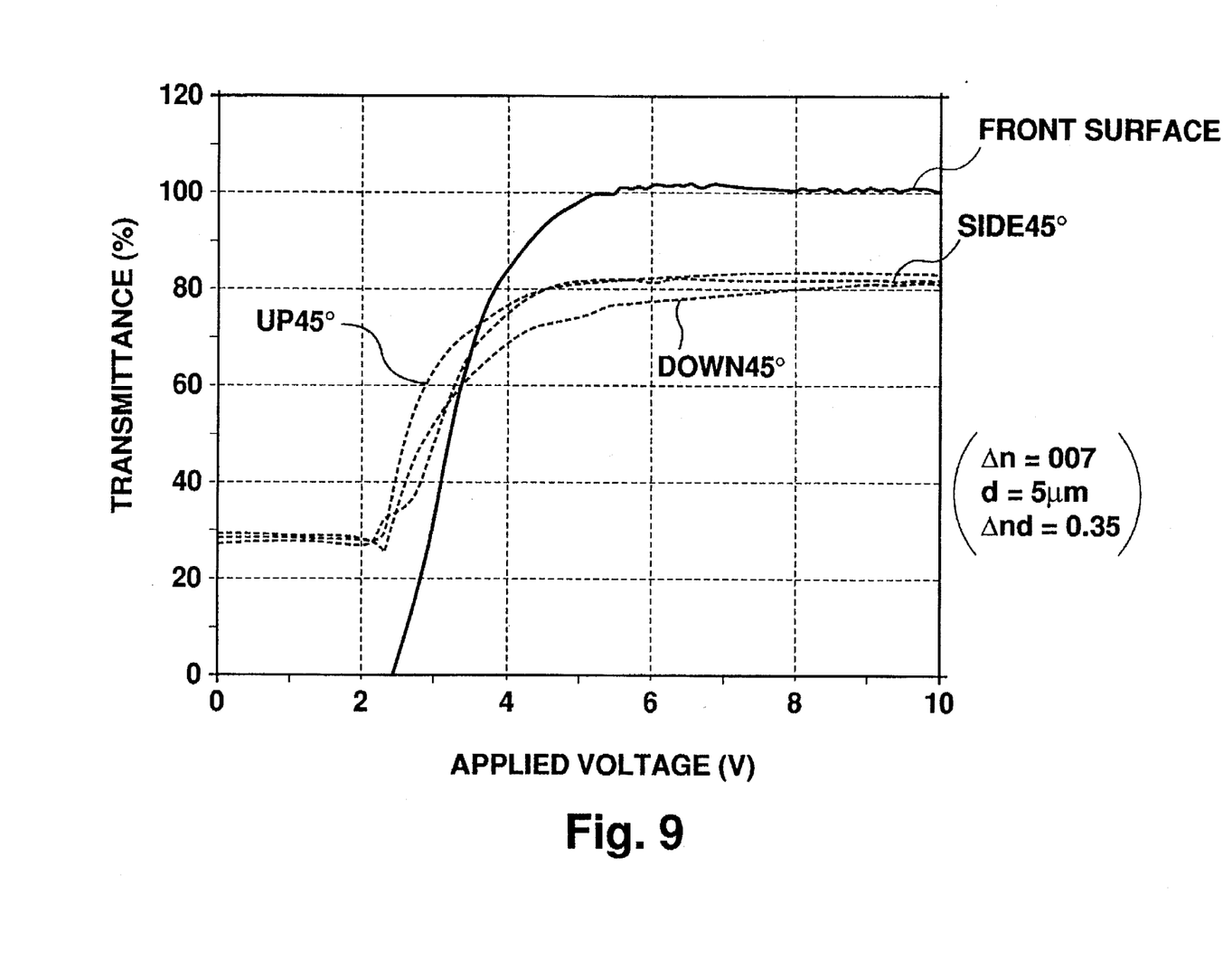
FIG. 9 is a graphic diagram showing operation and effects of the liquid crystal display device according to the first embodiment of the present invention.

The aforementioned embodiment also has an advantage in viewing angle characteristics. FIG. 9 is a graphic diagram showing viewing angle characteristics of a liquid crystal display device in NB (Normally Black) mode, in which the horizontal axis and the vertical axis stand for applied voltage to be applied to the liquid crystal cell and transmittance of light passing through the liquid crystal cell (lightness), respectively.

In the case of the liquid crystal display device according to this embodiment, there are shown in FIG. 9 four types of curves, "FRONT SURFACE", "SIDE 45°", "UP 45°", and "Down 45°". The line "Front Surface" represents a viewing angle characteristics curve when the screen is seen from the front surface, and in the same manner, "SIDE 45°" from a lateral direction of 45 degrees, "UP 45°" from an upper direction of 45 degrees, and "DOWN 45°" from a lower direction of 45 degrees respectively. In comparing the line "FRONT SURFACE" with the other three lines, it is understood that the latter have almost the same characteristics. This means that there is almost no difference between the characteristics of the image display depending on the viewing angle direction. Therefore, unlike a TN mode type liquid crystal display device, the characteristics of the display image do not significantly vary depending on the viewing angle with respect to the screen, so that a liquid crystal display device having improved viewing angle characteristics and wide viewing angle is provided.

Second Embodiment

A liquid crystal display device according to a second embodiment of this invention will now be described with reference to FIGS. 10-11. The same composition as in the first embodiment will be omitted from explanation, since the liquid crystal display device according to this embodiment is similar to that of the first embodiment, but different therefrom in the form of the opening formed in the opposed electrode 26.

A liquid crystal display device according to the second embodiment of this invention will be described. FIG. 10 is a plan view showing an arrangement of electrodes of a liquid crystal display device according to a second embodiment of this invention, while FIG. 11 is a cross-sectional view along line B'—B' in FIG. 10.

Figure 11:
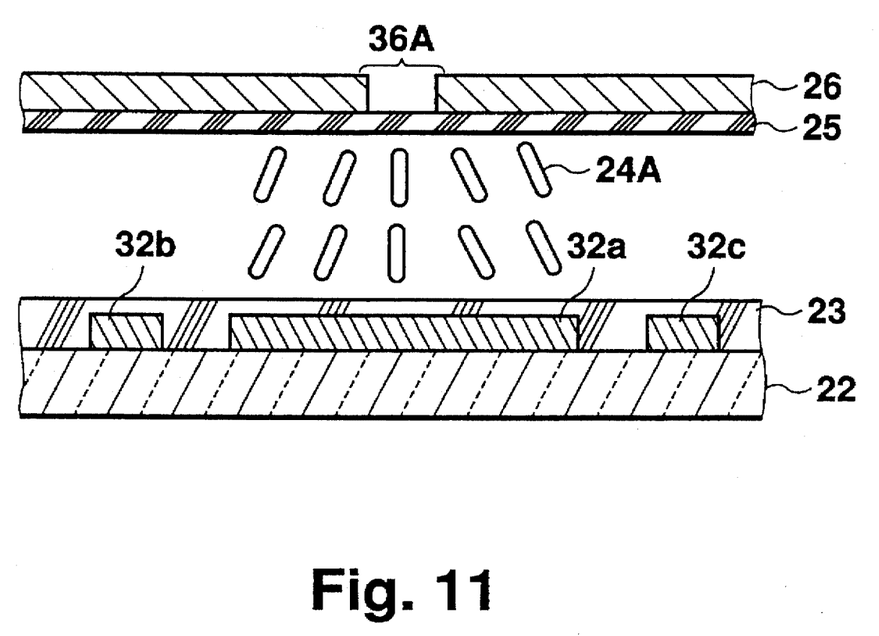
FIG. 11 is a schematic cross-sectional view along line B'—B' in FIG. 10.

The electrodes of the liquid crystal display device according to a second embodiment of this invention are arranged as shown in FIG. 11. Pixel electrodes 32a made of ITO film and having a dimension of 300 μm×200 μm are formed on the TFT substrate 22, and gate bus lines 32b and 32c each with a width of approximately 10 μm are formed at both sides thereof. On a first alignment layer 23 there is formed a liquid crystal layer having liquid crystal molecules 24A being aligned vertically, and further an opposed electrode 26 made of ITO film is provided thereon via a second alignment layer 25.

Drain bus lines (not shown) are formed to perpendicularly cross the gate bus lines 32b and 32c at the periphery of the pixel electrode 32a, and a TFT (not shown) for applying a driving voltage is provided at the pixel electrode 32a.

An opening 36A in the form of a rectangle with a side width of 5 μm is formed at a region along one diagonal line of the pixel.

Figure 10:
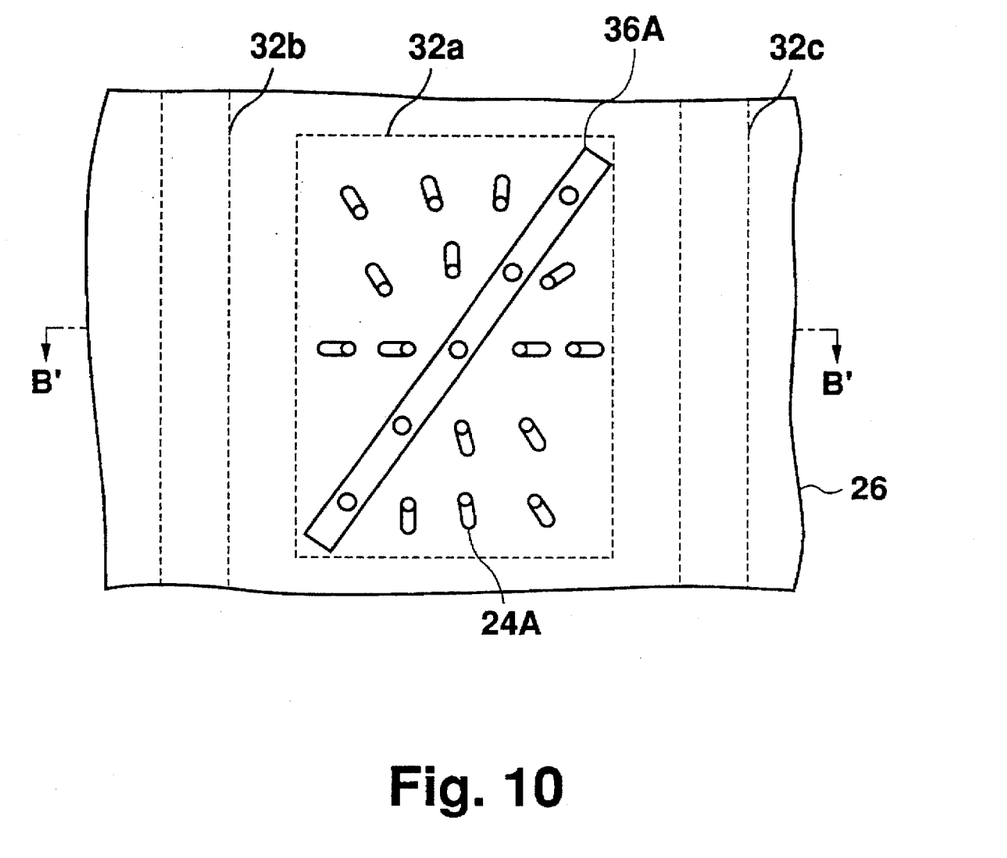
FIG. 10 is a plan view showing a composition of a liquid crystal display device according to a second embodiment of the present invention.

When the liquid crystal display device is driven and a voltage is applied to the pixel electrode 32a, an electric field arises between the pixel electrode 32a and the opposed electrode 26, causing the liquid crystal molecules 24A present in the region of the pixel electrode 32a to bend as shown in FIGS. 10 and 11.

Since no electrode is present in the opening 36A, the electric field in this region is weak and the liquid crystal molecules 24A present in the region of the opening will remain completely vertically aligned keeping its initial state without being subject to the effect of the electric field existing between the pixel electrode 32a and the opposed electrode 26.

Since the liquid crystal molecules 24A present in the region of the opening 36A remain in a stable state of completely vertical orientation, the orientation characteristics of the liquid crystal molecules 24A located at the peripheral region of the opening 36A also become stable. As a result, the oriented direction of the liquid crystal molecules 24A of each pixel will also be oriented so as to be on the diagonal line of the pixel, as shown in FIG. 10.

Thus, if the opening 36A is formed at the same position for all the regions of the pixels, the liquid crystal molecules 24A will be oriented in the same manner for all the pixels. In consequence, the liquid crystal director does is not diverge for each pixel, the disclination lines indicating the border line of the different oriented direction of the liquid crystal molecules 24A will appear uniformly for each pixel in the same manner as in the first embodiment. As a result, it is possible to suppress the mottles in the image so as to provide a clear display image.

Further, the characteristics of the display image do not significantly change depending on the viewing angle of the screen, unlike a TN mode liquid crystal display device, and like the first embodiment, so as to be able to improve the viewing angle characteristics.

Third Embodiment

A liquid crystal display device according to a third embodiment of the present invention will now be described with reference to FIGS. 12–13. The composition in common with the first and the second embodiments will be omitted for for simplification.

Figure 12:
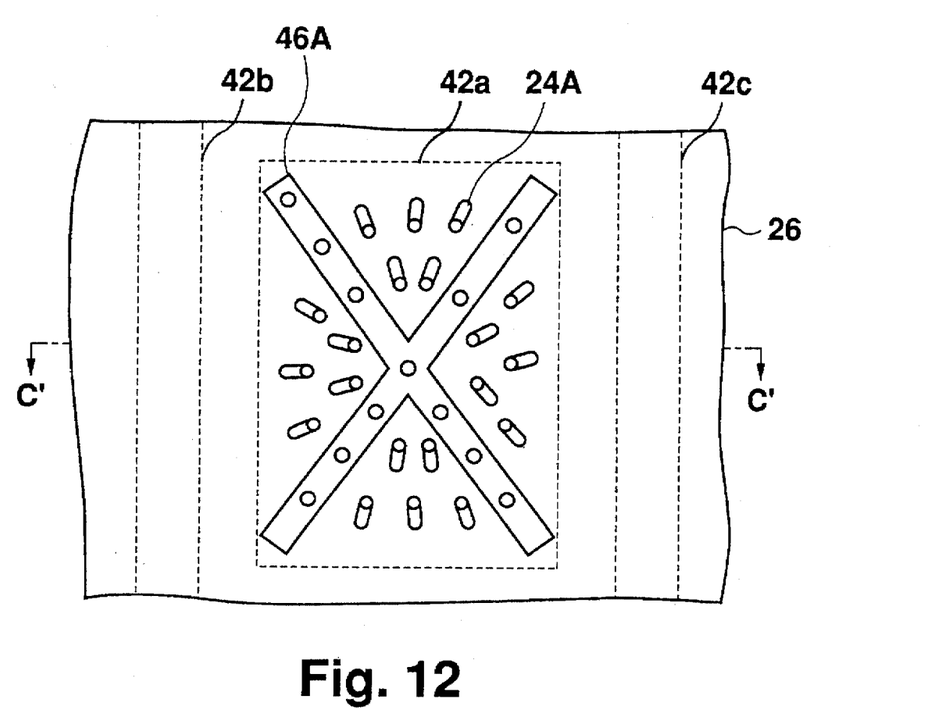
FIG. 12 is a plan view showing a composition of the liquid crystal display device according to a third embodiment of the present invention.
Figure 13:
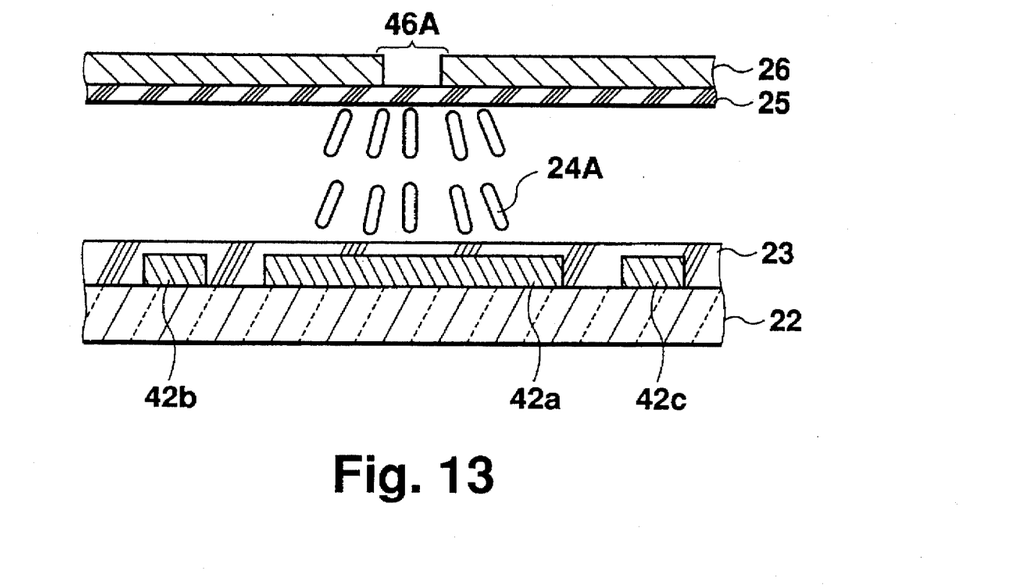
FIG. 13 is a schematic cross-sectional view along line C'—C' in FIG. 12.

FIG. 12 is a plan view of the electrode arrangement of a liquid crystal display divide according to a third embodiment of this invention, while FIG. 13 is a cross-sectional view along line C'—C' in FIG. 12.

As shown in FIG. 18, a pixel electrode 42a with a dimension of 300 µm×200 µm and made of ITO film is formed on the TFT substrate 22, and gate bus lines 42b and 42c each with a width of approximately 10 µm are formed ay both sides thereof. A liquid crystal layer having liquid crystal molecules 24A vertically aligned is provided thereon through a first alignment layer 23, and further An opposed electrode 26 made of ITO film is formed thereon through a second alignment layer 25.

At the periphery of the pixel electrode 42a, drain bus lines (not shown) are formed to perpendicularly cross the gate bus lines 42b and 42c, and a TFT (not shown) for applying a driving voltage is provided at the pixel electrode 42a.

The opposed electrode 26 has an opening 46A in the form of crossed rectangles with a side width of 5 µm is provided in an X-letter shape at the region along both diagonal lines of the pixel.

When the liquid crystal display device is operated and a voltage is applied to the pixel electrode 42a, an electric field arises between the pixel electrode 42a and the opposed electrode 26, causing the liquid crystal molecules 24A of the liquid crystal layer present in the region of the pixel electrode 42a to bend.

Since there is no electrode in the opening 46A, the electric field in this region is quite weak, so that the liquid crystal molecule 24A located in the region of the opening 46A are scarcely subjected to the effect of the electric field between the pixel electrode 42a and the opposed electrode 26. As a result, the initial vertically aligned state is maintained stably.

At the edge portion of the periphery of the pixel electrode 42a, the electric field at the time of the application of the voltage is generated in the direction from the pixel electrode 42a toward the opposed electrode 26 so as to extend from inside the pixel region to outside the pixel region. The liquid crystal molecules 24, bend in the direction of increasing the initial angle formed by the molecular axis and the electric field with the minimum distance in respect of the electric field in the oblique direction, so as to incline from the four sides of the pixel to the inside of the pixel. As a result, the opening 46A is formed in an X-letter shape along the diagonal lines of the pixel, so that the border of each region of the oriented direction toward the inside from the four sides is fixed on the opening 46A. At each region divided by the opening 46A, the oriented state of the liquid crystal is aligned uniformly and each region is oriented in a mutually different direction. In consequence, the optimum viewing direction is equally divided into four directions so as to lower the viewing angle dependence. In this manner, this embodiment is particularly suitable for an active matrix type display device using TFTs.

Therefore, the liquid crystal director is not dispersed for each pixel, the liquid crystal director present at the opening region are vertically aligned with stable orientation characteristics, and the liquid crystal director at the periphery thereof are also oriented toward approximately the central portion of the pixel in the same manner as in the first and the second embodiments due to the mutual action with the stable liquid crystal director at the region of the opening.

Therefore, by providing an opening at the same position of each pixel, the oriented direction of the liquid crystal director will be oriented toward the central portion of each pixel without dispersing.

In consequence, as in the first and the second embodiments, the liquid crystal director of each pixel are uniformly oriented so that the disclination line indicating the border line of the different by oriented directions of the liquid crystal director appears for each pixel in the same manner or the disclination lines are identically generated at the outline portion of the opening 46A. As a result, the mottles appearing in the image can be prevented, so as to provide clean display image.

Also in respect of the viewing angle characteristics, in the same manner as in the first and the second embodiments, the characteristics of the display image would not significantly change depending on the viewing angle, unlike a TN-mode liquid crystal display device, so the viewing angle characteristics would be improved.

According to a liquid crystal display device of this invention, a liquid crystal layer 12 having liquid crystal director vertically aligned between the pixel electrode 11 and the opposed electrode 13 is provided and the opening 14 is formed at the opposed electrode 13.

Therefore, no rubbing process is required, unlike the conventional liquid crystal display device and the viewing angle characteristics and the uniformity of the oriented liquid crystal director of each pixel are improved. Consequently, the disclination lines would appear for each pixel in the same manner so as to provide a clear display image without any mottles.

What is claimed is:

1. A liquid crystal display device comprising:
   a liquid crystal layer having first and second surfaces;
   first and second substrates opposed to each other with the liquid crystal layer disposed therebetween;
   a plurality of pixel electrodes disposed between said first surface of the liquid crystal layer and the first substrate;
   an opposed electrode disposed between said second surface of the liquid crystal layer and the second substrate;
   a plurality of pixels, each pixel including one of the plurality of pixel electrodes, the opposed electrode, and a respective portion of the liquid crystal layer disposed between said one of the plurality of pixel electrodes and said opposed electrode, wherein at least one of the plurality of pixels has an opening formed only at a substantial center of said at least one of the plurality of pixels so that an initial orientation of said liquid crystal layer substantially within said opening remains substantially stable when said liquid crystal layer is subjected to an electric field between a respective one of said plurality of pixel electrodes and said opposed electrode, and wherein said opening is formed in one of said opposed electrode and said respective one of said plurality of pixel electrodes.

2. The liquid crystal display device of claim 1, wherein the plurality of pixel electrodes are arranged in a matrix form.

3. The liquid crystal display device of claim 2, wherein a plurality of switching elements are arranged on a surface of the first substrate facing the first surface of the liquid crystal layer and are coupled to the plurality of pixel electrodes.

4. The liquid crystal display device of claim 2, wherein the opposed electrode is formed almost all over a surface of the second substrate as a single electrode.

5. The liquid crystal display device of claim 2, wherein the opening is formed inside each of said plurality of pixels.

6. The liquid crystal display device of claim 5, wherein the opening is formed in said opposed electrode at a central portion of each of said plurality of pixels.

7. A liquid crystal display device comprising:

a liquid crystal layer having first and second surfaces, said liquid crystal layer including a plurality of liquid crystal molecules;

first and second substrates opposed to each other with the liquid crystal layer disposed therebetween;

a plurality of pixel electrodes disposed between said first surface of the liquid crystal layer and the first substrate;

an opposed electrode disposed between said second surface of the liquid crystal layer and the second substrate;

a plurality of pixels, each pixel including one of the plurality of pixel electrodes, the opposed electrode, and a respective portion of the liquid crystal layer, including a respective portion of the plurality of liquid crystal molecules, disposed between said one of the plurality of pixel electrodes and said opposed electrode, wherein at least one of the plurality of pixels has an opening formed substantially at a center of said at least one of the plurality of pixels, wherein said opening is formed in one of said opposed electrode and a respective one of said plurality of pixel electrodes, and wherein said liquid crystal molecules within said respective portion of the plurality of liquid crystal molecules, within said at least one of the plurality of pixels, become substantially stably oriented substantially toward said center when said liquid crystal molecules are subjected to an electric field between said respective one of said plurality of pixel electrodes and said opposed electrode.

8. The liquid crystal display device of claim 7, wherein the plurality of pixel electrodes are arranged in a matrix form.

9. The liquid crystal display device of claim 8, wherein a plurality of switching elements are arranged on a surface of the first substrate facing the first surface of the liquid crystal layer and are coupled to the plurality of pixel electrodes.

10. The liquid crystal display device according to claim 8, wherein the opposed electrode is formed almost all over a surface of the second substrate as a single electrode.

11. The liquid crystal display device of claim 8, wherein the opening is formed inside each of said plurality of pixels.

12. The liquid crystal display device according to claim 11, wherein the opening is formed in said opposed electrode substantially at a central portion of each of said plurality of pixels.

* * * * *